US011712958B2

(12) United States Patent
Desai et al.

(10) Patent No.: US 11,712,958 B2
(45) Date of Patent: Aug. 1, 2023

(54) MULTIPURPOSE AGRICULTURAL VEHICLE WITH RECONFIGURABLE POWER

(71) Applicant: CNH INDUSTRIAL LLC, New Holland, PA (US)

(72) Inventors: Pinakin S. Desai, Naperville, IL (US); Peter Josesph Zerillo, Chicago, IL (US); Stephen Michael Faivre, Sycamore, IL (US); Nathan Taylor, Sycamore, IL (US); Kevin David Monk, Shorewood, IL (US); David W. Larson, Maple Park, IL (US)

(73) Assignee: CNH Industrial America LLC

( * ) Notice: Subject to any disclaimer, the term of this patent is extended or adjusted under 35 U.S.C. 154(b) by 992 days.

(21) Appl. No.: 16/303,840

(22) PCT Filed: May 24, 2017

(86) PCT No.: PCT/US2017/034303
§ 371 (c)(1),
(2) Date: Nov. 21, 2018

(87) PCT Pub. No.: WO2017/205526
PCT Pub. Date: Nov. 30, 2017

(65) Prior Publication Data
US 2020/0315097 A1   Oct. 8, 2020

Related U.S. Application Data

(60) Provisional application No. 62/340,928, filed on May 24, 2016.

(51) Int. Cl.
*A01D 90/16* (2006.01)
*B60K 1/04* (2019.01)
(Continued)

(52) U.S. Cl.
CPC ............... *B60K 1/04* (2013.01); *A01D 90/16* (2013.01); *B60K 6/24* (2013.01); *B60K 6/26* (2013.01);
(Continued)

(58) Field of Classification Search
CPC ... B60K 1/04; B60K 6/24; B60K 6/26; B60K 7/0007; B60K 2001/0455; B60K 5/10;
(Continued)

(56) References Cited

U.S. PATENT DOCUMENTS 3,473,679 A   10/1969   Weichel
4,078,523 A   3/1978   Etzler
(Continued)

FOREIGN PATENT DOCUMENTS

DE   3302111 A1   7/1984
DE   102014015698   4/2016
(Continued)

OTHER PUBLICATIONS

International Search Report from PCT/US2017\034303, dated May 24, 2017, pp. 4.

*Primary Examiner* — Jonathan M Dager
*Assistant Examiner* — Jean W Charleston
(74) *Attorney, Agent, or Firm* — Peter Zacharias

(57) ABSTRACT

A method of manufacturing an autonomous cart is provided. The method includes determining a mission type for the autonomous cart and determining a power system for powering the autonomous cart based on the mission type. The method further includes determining a drive system suitable for converting a power delivered by the power system into motive power suitable for moving the autonomous cart based on the power system and the mission type. The method further includes installing the power system onto a chassis of the autonomous cart and installing the drive (Continued)

system onto the chassis of the autonomous cart, wherein the autonomous cart comprises a control system configured to drive the autonomous cart autonomously via the power system and the drive system.

18 Claims, 8 Drawing Sheets

(51) Int. Cl.
| | |
|---|---|
| *B60K 6/24* | (2007.10) |
| *B60K 6/26* | (2007.10) |
| *B60K 7/00* | (2006.01) |
| *B60W 10/04* | (2006.01) |
| *B60W 10/20* | (2006.01) |
| *B62D 65/10* | (2006.01) |
| *B60L 50/40* | (2019.01) |
| *B60W 60/00* | (2020.01) |
| *G05D 1/00* | (2006.01) |
| *G05D 1/02* | (2020.01) |

(52) U.S. Cl.
CPC .......... *B60K 7/0007* (2013.01); *B60W 10/04* (2013.01); *B60W 10/20* (2013.01); *B62D 65/10* (2013.01); *B60L 50/40* (2019.02); *B60W 60/0025* (2020.02); *B60W 2300/15* (2013.01); *B60W 2710/0666* (2013.01); *B60W 2710/083* (2013.01); *B60W 2720/10* (2013.01); *B60W 2720/12* (2013.01); *G05D 1/0088* (2013.01); *G05D 1/0278* (2013.01); *G05D 2201/0201* (2013.01)

(58) Field of Classification Search
CPC .. B60K 7/0015; B60K 15/067; B60K 17/342; A01D 90/16; B60W 10/04; B60W 10/20; B60W 60/0025; B60W 2300/15; B60W 2710/0666; B60W 2710/083; B60W 2720/10; B60W 2720/12; B62D 65/10; B60L 50/40; G05D 1/0088; G05D 1/0278; G05D 2201/0201; Y02T 10/70
USPC .......................................................... 701/23
See application file for complete search history.

(56) References Cited

U.S. PATENT DOCUMENTS

| | | | |
|---|---|---|---|
| 4,460,214 A | 7/1984 | Kuhns | |
| 6,073,070 A * | 6/2000 | Diekhans | A01B 79/005 |
| | | | 180/167 |
| 9,949,435 B2 * | 4/2018 | Banks, Jr. | A01D 41/1208 |
| 10,201,022 B2 * | 2/2019 | Matthews | A01B 69/008 |
| 10,318,138 B2 * | 6/2019 | Schøler | H04Q 9/00 |
| 10,412,893 B2 * | 9/2019 | Missotten | G05D 1/0291 |
| 2006/0047418 A1 * | 3/2006 | Metzler | A01B 69/007 |
| | | | 701/50 |
| 2006/0180238 A1 * | 8/2006 | Koelker | B65B 3/16 |
| | | | 141/114 |
| 2012/0085458 A1 * | 4/2012 | Wenzel | G05D 1/0291 |
| | | | 141/10 |
| 2013/0022430 A1 * | 1/2013 | Anderson | B65G 67/22 |
| | | | 414/334 |
| 2014/0277963 A1 * | 9/2014 | Van Mill | A01D 90/10 |
| | | | 701/50 |
| 2015/0274000 A1 * | 10/2015 | Meager | B62D 61/06 |
| | | | 440/12.66 |

FOREIGN PATENT DOCUMENTS

| | | | | |
|---|---|---|---|---|
| DE | 102014015698 A1 * | 4/2016 | ................ | B60F 5/00 |
| FR | 2548603 A1 | 1/1985 | | |
| GB | 2093415 A | 9/1982 | | |
| NL | 8501341 A | 12/1986 | | |
| WO | 2015072087 | 5/2015 | | |

\* cited by examiner

MULTIPURPOSE AGRICULTURAL VEHICLE WITH RECONFIGURABLE POWER

CROSS REFERENCE TO RELATED APPLICATIONS

This application is a national stage of PCT Application No. PCT/US2017/34304, entitled "MULTIPURPOSE AGRICULTURAL VEHICLE WITH RECONFIGURABLE POWER", filed on May 24, 2017, which claims priority from and the benefit of U.S. Provisional Patent Application Ser. No. 62/340,928, entitled "MULTIPURPOSE AGRICULTURAL VEHICLE WITH RECONFIGURABLE POWER", filed May 24, 2016. Each of the foregoing applications is hereby incorporated by reference in its entirety.

BACKGROUND

The present disclosure relates generally to vehicles, and more specifically to multipurpose agricultural vehicles with reconfigurable power.

Increasing productivity of agricultural operations may be achieved by increasing efficiency of the agricultural vehicles and/or other machines involved. Often specialized machines are used for specific tasks, resulting in an increasing variety of vehicles and/or machines. For example, different vehicle designs exist for grain carts, as compared to crop sprayer support vehicles, seeders/planter support vehicles, and the like. Current equipment is designed for a specific crop production process or in support of equipment involved in crop production. This limits the utilization of the equipment in different set of crop production processes. Likewise, different vehicles may use different power units, such as combustion engines and electrical motors. However, increasing the variety of vehicles may typically increase the acquisition and/or operational costs of the fleet of vehicles and/or machines. Additionally, larger agricultural vehicle fleets may be more difficult to store, and transport due to the number of the vehicles/machines. The larger fleets typically use more parking space as well as transport space, for example, when being transported to various fields. Furthermore, maintenance operations may have greater consequences and impact when the agricultural vehicles and/or machines are more numerous, affecting parts procurement efficiency and cost, as well as overall time and cost of maintenance.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the disclosure may encompass a variety of forms that may be similar to or different from the embodiments set forth below.

In a first embodiment, a method of manufacturing an autonomous cart is provided. The method includes determining a mission type for the autonomous cart and determining a power system for powering the autonomous cart based on the mission type. The method further includes determining a drive system suitable for converting a power delivered by the power system into motive power suitable for moving the autonomous cart based on the power system and the mission type. The method further includes installing the power system onto a chassis of the autonomous cart and installing the drive system onto the chassis of the autonomous cart, wherein the autonomous cart comprises a control system configured to drive the autonomous cart autonomously via the power system and the drive system.

In a second embodiment, an autonomous cart includes a chassis and a first power system disposed on the chassis and configured to power the autonomous cart. The autonomous cart further includes a first drive system disposed on the chassis and suitable for converting a power delivered by the first power system into motive power suitable for moving the autonomous cart. The autonomous cart also includes a controller, comprising a processor and a memory. The autonomous cart additionally includes a steering system communicatively coupled to the controller, wherein the controller is configured to instruct the steering system to steer the autonomous grain cart, wherein the chassis is configured to support a specific mission type via the first power system and the first drive system.

In a third embodiment, a system for continuously conveying agricultural product is provided. The system includes an agricultural vehicle comprising a header configured to harvest agricultural product from a field. The system further includes at least one autonomous grain carts configured to receive the agricultural product from the agricultural vehicle. The at least one autonomous grain cart comprises a chassis and a first power system disposed on the chassis and configured to power the autonomous cart. The autonomous cart further includes a first drive system disposed on the chassis and suitable for converting a power delivered by the first power system into motive power suitable for moving the autonomous cart. The autonomous cart also includes a controller, comprising a processor and a memory. The autonomous cart additionally includes a steering system communicatively coupled to the controller, wherein the controller is configured to instruct the steering system to steer the autonomous grain cart, wherein the chassis is configured to support a specific mission type via the first power system and the first drive system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

It may be desirable to have a multipurpose vehicle, such as a multipurpose agricultural vehicle, that may share a common set of components yet provide for reconfigurable components, such as power units, including "plug-and-play" power capabilities, suitable for powering a variety of operations and missions. The multipurpose vehicle may include an autonomous embodiment having a chassis with power units that may be reconfigured, for example, in the field, to provide for a variety of different power production and/or transmission capabilities onto the same reusable platform. The chassis may provide support for a variety of platforms and may additionally provide for reconfiguration of power used by the autonomous vehicle. The chassis may be fitted with two or more axles. For example, a large grain cart application may require extra axle(s) for floatation in an agricultural field. The chassis may additionally provide for the option of fitting 4-wheel-steering, for example, to enhance maneuverability.

Figure 1:
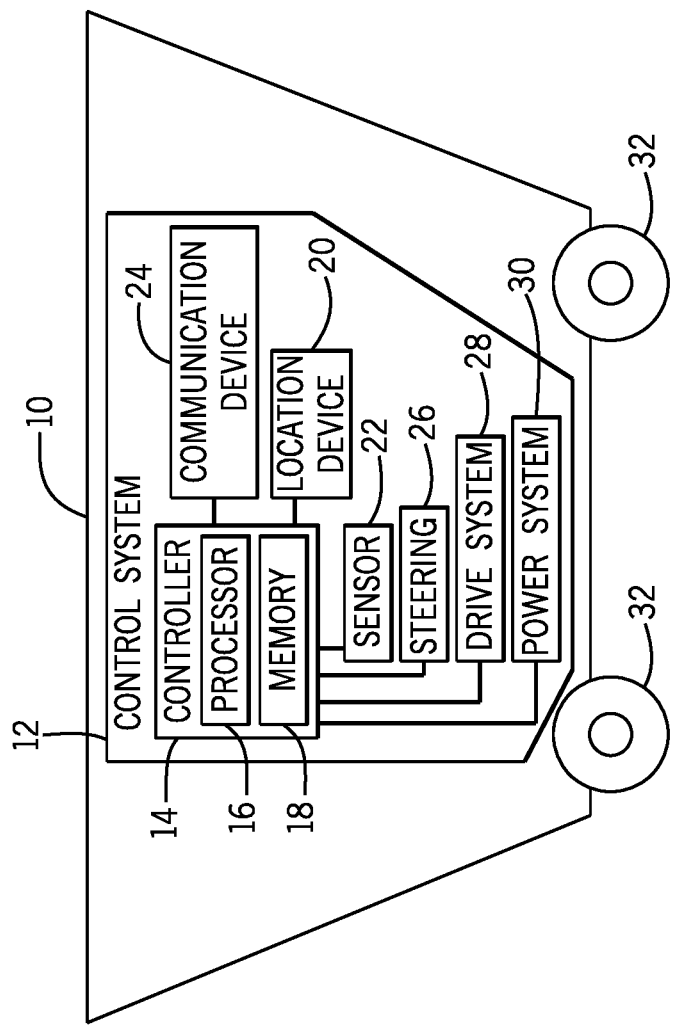
FIG. 1 is a diagram of an autonomous cart, in accordance with an embodiment of the present disclosure

Turning now to FIG. 1, the figure is a diagram of an autonomous cart 10, in accordance with an embodiment of the present disclosure. It should be appreciated that while the illustrated embodiment includes the autonomous cart 10 depicted as a grain cart, the present disclosure contemplates any vehicle suitable for transporting material, such as a hauling vehicle, transport vehicle, delivery vehicle, loading and/or unloading vehicle, and the like.

The autonomous cart 10 includes a control system 12 having a controller 14. The controller 14 includes a processor 16 (e.g., a microprocessor) that may execute software, such as software for controlling the autonomous cart 10. Moreover, the processor 16 may include multiple microprocessors, one or more "general-purpose" microprocessors, one or more special-purpose microprocessors, and/or one or more application specific integrated circuits (ASICS), or some combination thereof. For example, the processor 16 may include one or more reduced instruction set (RISC) processors. The controller 14 includes a memory device 18 that may store information such as control software, look up tables, configuration data, etc. In some embodiments, the controller 14 may be coupled to the memory device 18. The memory device 18 may include a volatile memory, such as random access memory (RAM), and/or a nonvolatile memory, such as read-only memory (ROM). The memory device 18 may store a variety of information and may be used for various purposes. For example, the memory device 18 may store processor-executable instructions (e.g., firmware or software) for the processor 16 execute, such as instructions for controlling the autonomous cart 10. In some embodiments, the memory device 18 is a tangible, non-transitory, machine-readable-medium that may store machine-readable instructions for the processor 16 to execute. The memory device 18 may include ROM, flash memory, a hard drive, or any other suitable optical, magnetic, or solid-state storage medium, or a combination thereof. The memory device 18 may store data (e.g., position data, identification data, etc.), instructions (e.g., software or firmware for controlling the agricultural vehicle 10, etc.), any other suitable data, or a combination thereof. For example, the memory device 18 may store a harvesting map and/or a harvesting pattern suitable for being followed autonomously by the autonomous cart 10.

The controller 14 is communicatively coupled to a location device 20 that is configured to determine a position of the autonomous cart 10. As will be appreciated, the location device 20 may include any suitable system configured to determine the position of the autonomous cart 10, such as a global positioning system (GPS), for example. In certain embodiments, the location device 20 may be configured to determine the position of the autonomous cart 10 relative to a fixed point within the field (e.g., via a fixed radio transceiver). Accordingly, the autonomous cart 10 may be configured to determine the position of the autonomous cart 10 relative to a fixed global coordinate system (e.g., via the GPS) or a fixed local coordinate system. In some embodiments, the location device 20 may enable the controller 14 to determine a speed of the autonomous cart 10 during operation.

The controller 14 is communicatively coupled to one or more sensors 22, such as a speed sensor, a proximity sensor, a terrain sensor, a weight sensor, a fill sensor, etc. The speed sensor may enable the controller 14 to determine a speed of the autonomous cart 10 during operation. The weight sensor may enable the controller 14 to determine a weight of the autonomous cart 10 and contents of the autonomous cart 10. The fill sensor may enable the controller 14 to determine a depth of the contents (e.g., grain) of the autonomous cart 10. The proximity sensor may enable the controller 14 to detect nearby objects or vehicles. The terrain sensor may enable the controller 14 to determine aspects of the terrain under and/or adjacent to the autonomous cart 10. For example, the terrain sensor may enable the autonomous cart 10 to detect rough and bumpy terrain, smooth terrain, muddy terrain, and the like. In some embodiments, the terrain sensor is configured to output a signal indicative of at least one property of terrain to the autonomous cart 10. The weight sensor may enable the controller 14 to determine a weight of the autonomous cart 10 and its contents. The fill sensor may enable the controller 14 to determine a depth of the contents (e.g., grain) of the autonomous cart 10.

The controller 14 is communicatively coupled to a communication device 24 that enables the controller 14 to send and receive information over a communication network, such as a wireless communication network. For example, the communication device 24 may enable the controller 14 to receive information about agricultural and other equipment, such as location information received from the location device 20 of the equipment. Advantageously, the use of the autonomous carts 10 may reduce operator and vehicle costs, for example, as when compared to collecting grain via an operator-driven tractor coupled to a trailer.

The controller 14 also includes a steering system 26 configured to steer, navigate, and/or orient the autonomous cart 10. The controller 14 is communicatively coupled to a drive system 28 configured to propel, accelerate, and/or decelerate the autonomous cart 10. The drive system 28 may be mechanically and/or electrically coupled to a power unit or system 30, for example to receive power from the power unit 30 suitable for moving wheels 32. The techniques described herein may provide for a variety of drive systems 28 and/or power units 30 that may be attached onto the autonomous cart 10 based on certain mission needs and/or cart 10 requirements. For example, certain operations may have natural gas and/or biogas more easily available, and so gas power supplies may be provided. Other operations may prefer to use electrical power based on solar panel availability for recharge. Yet other operations may desire to use traditional carbonaceous fuels such as gasoline and diesel. Other missions may use hydraulic power, hydrostatic power, compressed air, and so on. By selecting certain drive systems 28 and/or power systems 30, the cart 10 may be configured to provide for a more efficient, maintainable, and lower cost autonomous vehicle suitable for a variety of operational tasks.

Figure 2:
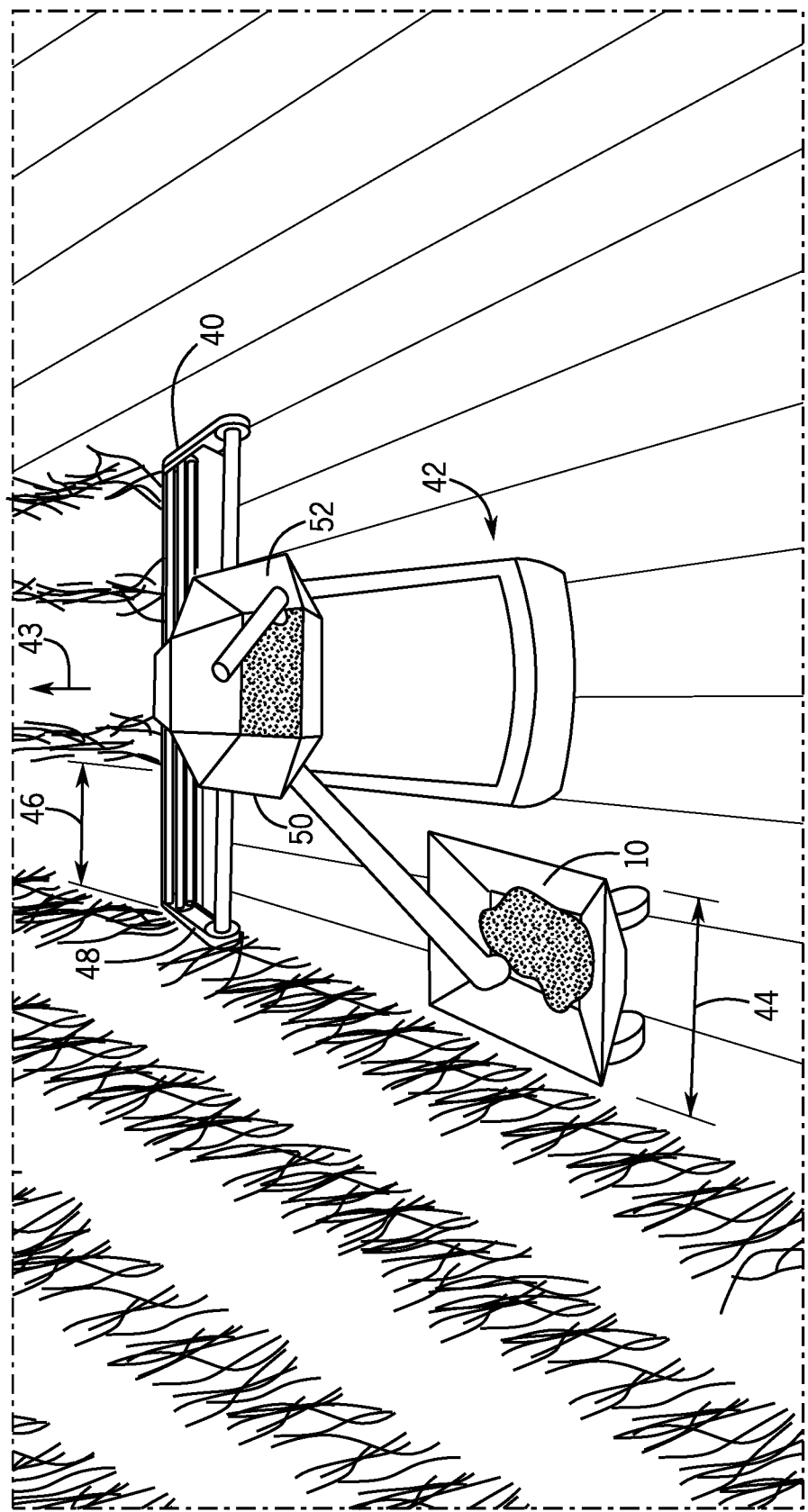
FIG. 2 is a diagram of an embodiment of the autonomous cart of FIG. 1 depicted as supporting operations of an agricultural vehicle.

The autonomous cart 10 may be built in various sizes and dimensions. For example, for agricultural grain cart applications, the grain cart 10 may be dimensioned such that the grain cart 10 may fit between an end of a header of a combine and a closer, nearer, or proximal lateral side of the combine. It may be beneficial to describe certain agricultural operations that may be performed by the autonomous cart 10. Accordingly, FIG. 2 is a prospective view of the autonomous grain cart 10 of FIG. 1 positioned behind a header 40 of an agricultural combine 42 that is operating in a direction 43 to harvest agricultural product, in accordance with an embodiment of the present disclosure. Selecting a width 44 of the autonomous cart 10 that is less than or equal to a distance 46 from an end 48 of the header 30 to a lateral side 50 of the combine 42, wherein the end and the lateral side are on a same longitudinal side of a lateral centerline of the combine 42, enables the autonomous cart 10 to travel alongside the combine 42 on the crop side of the combine 42 (as well as the harvested side of the combine 42).

Advantageously, the autonomous cart 10 may be dimensioned such that the autonomous cart 10 fits behind the header 40 of the combine 42, thereby enabling the autonomous cart 10 to travel alongside the combine 42 on the crop side of the combine 42 and increase harvesting efficiency. Additionally, autonomous harvesting patterns may be utilized without regard to the limitation of placing the autonomous cart 10 on only the harvested side of the combine 42. As such, the combine 42 may make 180 degree turns (e.g., when transitioning from one row of the harvesting pattern to another) while continuing to unload grain because of the ability of the autonomous cart 10 to fit behind the header 40 on the crop side of the combine 42. Moreover, harvesting headlands first (e.g., before harvesting crop rows) may be avoided, if the field includes enough space for the combine 42 and the autonomous cart 10 to turn at the edge of the field. Reducing the travel path of the combine 42 in this manner may increase crop production efficiency. With increased access to the combine 42, the size of the autonomous carts 10 and/or an internal storage tank 52 of the combine 42 may be reduced, resulting in less weight of the vehicles, and thus less soil compaction during operation.

Figure 3:
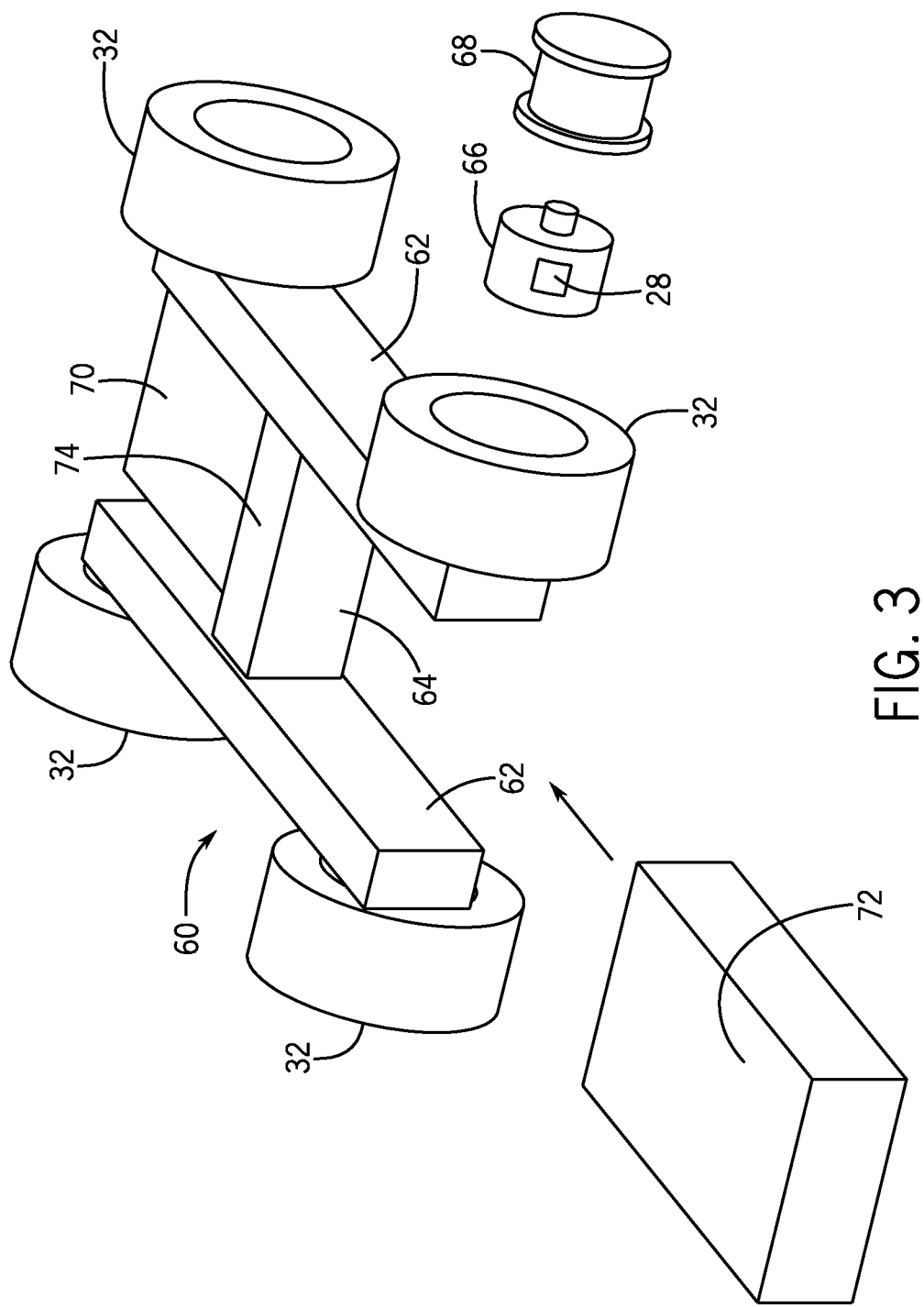
FIG. 3 is a perspective view of an embodiment of the autonomous cart of FIG. 1 including in-wheel electric motors for propulsion.

In order to provide motive power to the autonomous cart 10, a variety of drive systems 28 and power system 30 may be disposed on a common vehicle chassis, such as an embodiment of a chassis 60 shown in perspective view in FIG. 3. In the depicted embodiment, the chassis 60 includes two frame members 62 coupled to each other via a transversal member 64. In the depicted embodiment, motive power to the wheels 32 is provided by an in-wheel electrical motor system 66 disposed in a wheel hub 68. The in-wheel electric motor system 66, for example, may be an in-wheel electrical motor available from Protean Electric Co., of Shanghai, China, with U.S. offices in Troy, Mich. For two-wheel drive systems, two in-wheel electric motor systems 66 may be used, for example, side by side. For four-wheel drive systems, all of the wheels 32 may include the in-wheel electric motor system 66.

In the depicted embodiment, the in-wheel electrical motor system 66 may include a direct drive. That is, the controller 14 may be communicatively coupled to the direct drive of each in-wheel electrical motor system 66 to rotate the wheel 32 and the direct drive may be included inside the wheel 32. Indeed, a component (or all) of the drive system 28 may be disposed in the in-wheel electrical motor system 66. By using direct drive, the in-wheel electrical motor system 66 may require no gearboxes, driveshafts or differentials, thus providing more flexibility to vehicle designers while substantially reducing drivetrain losses. The reduced drivetrain losses mean less energy is wasted (during both acceleration and regenerative braking), resulting in more of the energy from a battery pack 70 being available to propel the autonomous cart 10.

For additional energy, the depicted embodiment includes a second battery pack 72. Furthermore, the transversal member 64 may include, for example, a supercapacitor or ultracapacitor 74. The supercapacitor 74 may store between 10 to 100 times more energy per unit volume when compared to an electrolytic capacitor, and may tolerate a substantially higher number of charge/discharge cycles as compared to a standard battery. The supercapacitor 74 may be preferentially used by the controller 14 to store energy during regenerative braking, and/or to provide for a burst-mode power delivery when extra power may be useful, for example.

The various components may be plug-and-play. For example, the autonomous vehicle 10 may operate with the single battery pack 70 or 72 and without the supercapacitor 74, or with both battery packs 70, 72 installed. Likewise, the autonomous vehicle 10 may operate with one of the single battery pack 70 or 72 and with the supercapacitor 74 installed.

Figure 4:
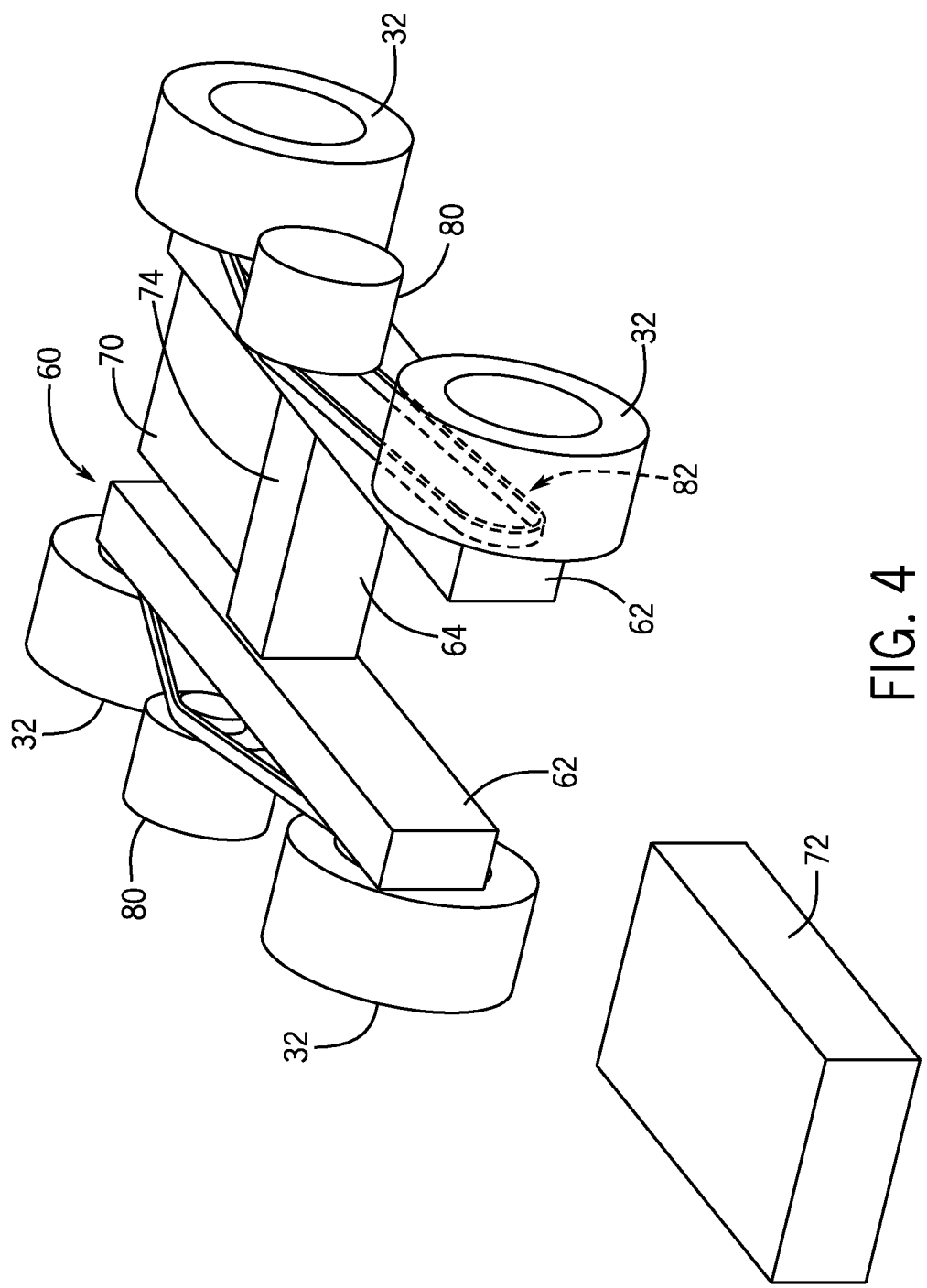
FIG. 4 is a perspective view of an embodiment of the autonomous cart of FIG. 1 including non-in-wheel electric motors for propulsion.

FIG. 4 illustrates an embodiment of the chassis 60 that includes two electrical motors 80 that may use chain drives 82 to rotatively power the wheels 32. Because the figure illustrates like elements as those found in FIG. 3, the like elements are illustrated using like element numbers. Using two electrical motors 80 motively connected to the wheels 32 via the chain drives 82 may provide for enhanced reliability and system life as the electrical motors 80 may include longer life motor brushes, commutators, and the like. It is also to be understood that the electrical motors 80 may be used additionally to the in-wheel electric motor system(s) 66, in certain embodiments, for example, to provide for added redundancy and/or increased torque. It is also to be noted that, in some embodiments, the chassis 60 may be reused when going from the systems shown in FIG. 3 to the systems of FIG. 4. Indeed, the chassis 60 may provide a common platform for all the embodiments of the autonomous cart described herein.

Figure 5:
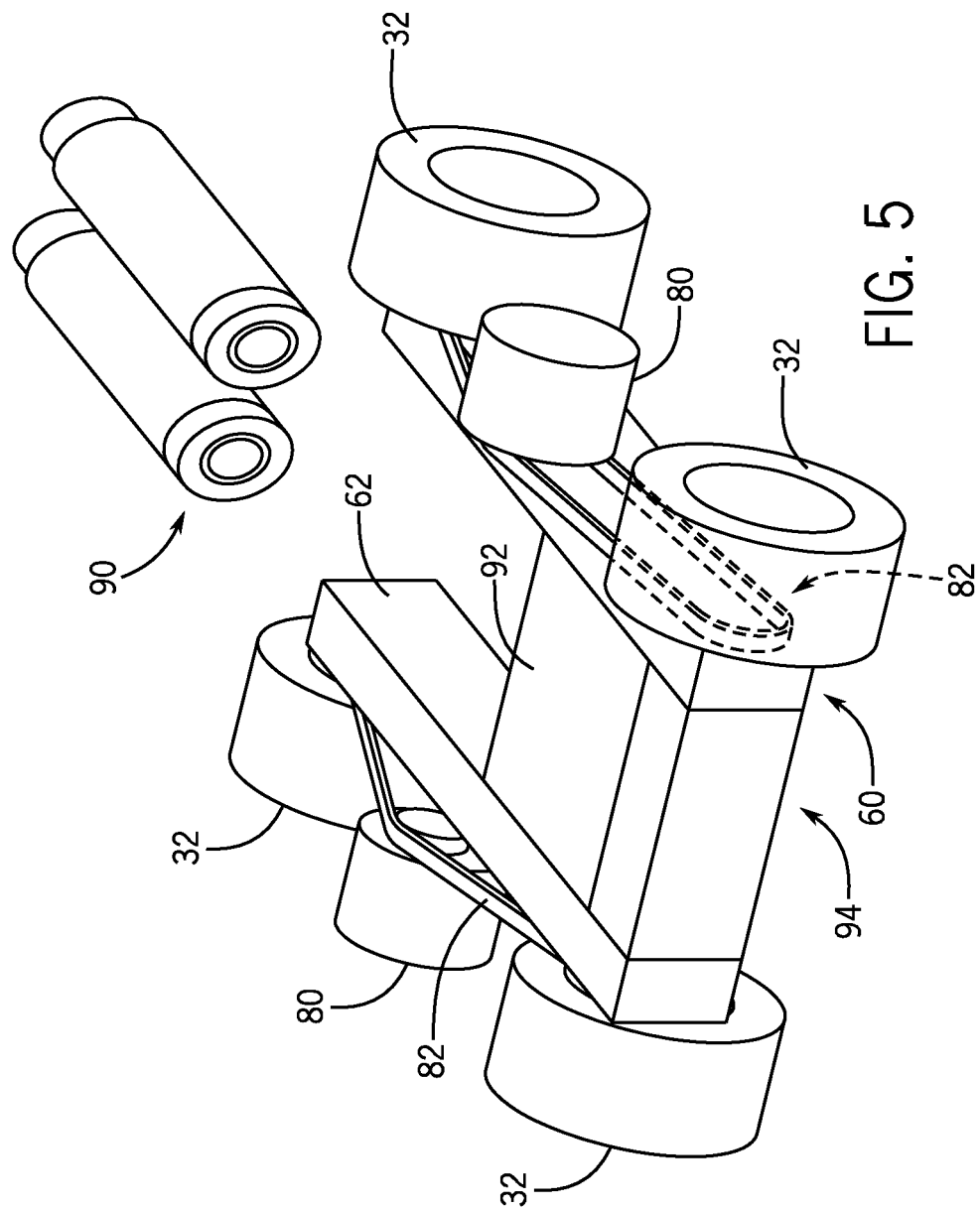
FIG. 5 is a perspective view of an embodiment of the autonomous cart of FIG. 1 including fuel canisters suitable for use as power supply for the autonomous cart.

Indeed, as shown in FIG. 5, certain embodiments of the autonomous cart 10 may include hybrid power systems that include, for example, a combination of power supply types. In the depicted embodiment, the chassis 60 may provide for the use of fuel canisters in addition to or alternative to the use of electric batteries. More specifically, fuel canisters 90 (e.g., gas or liquid fuel canisters) may be used to power an electric generator 92, which in turn may provide electrical power for use by the electric motors 80.

The fuel canisters 90 may include compressed natural gas (CNG) fuel canisters, in which case the electric generator 92 may include a CNG generator. Other types of fuel canisters 90 and corresponding generator 92 that may be used include propane canisters 90, biogas canisters 90, syngas canisters 90, and traditional fuels such as diesel, gasoline, and the like. The generator 92 may then be provided to match the fuel canister 90 type. A cooling unit 94 is also shown, disposed to cool the generator 92 while in use. By providing for hybrid drive and or propulsion system, the techniques described herein may enable a more efficient use of resources and fuel types with improved mission support.

Figure 6:
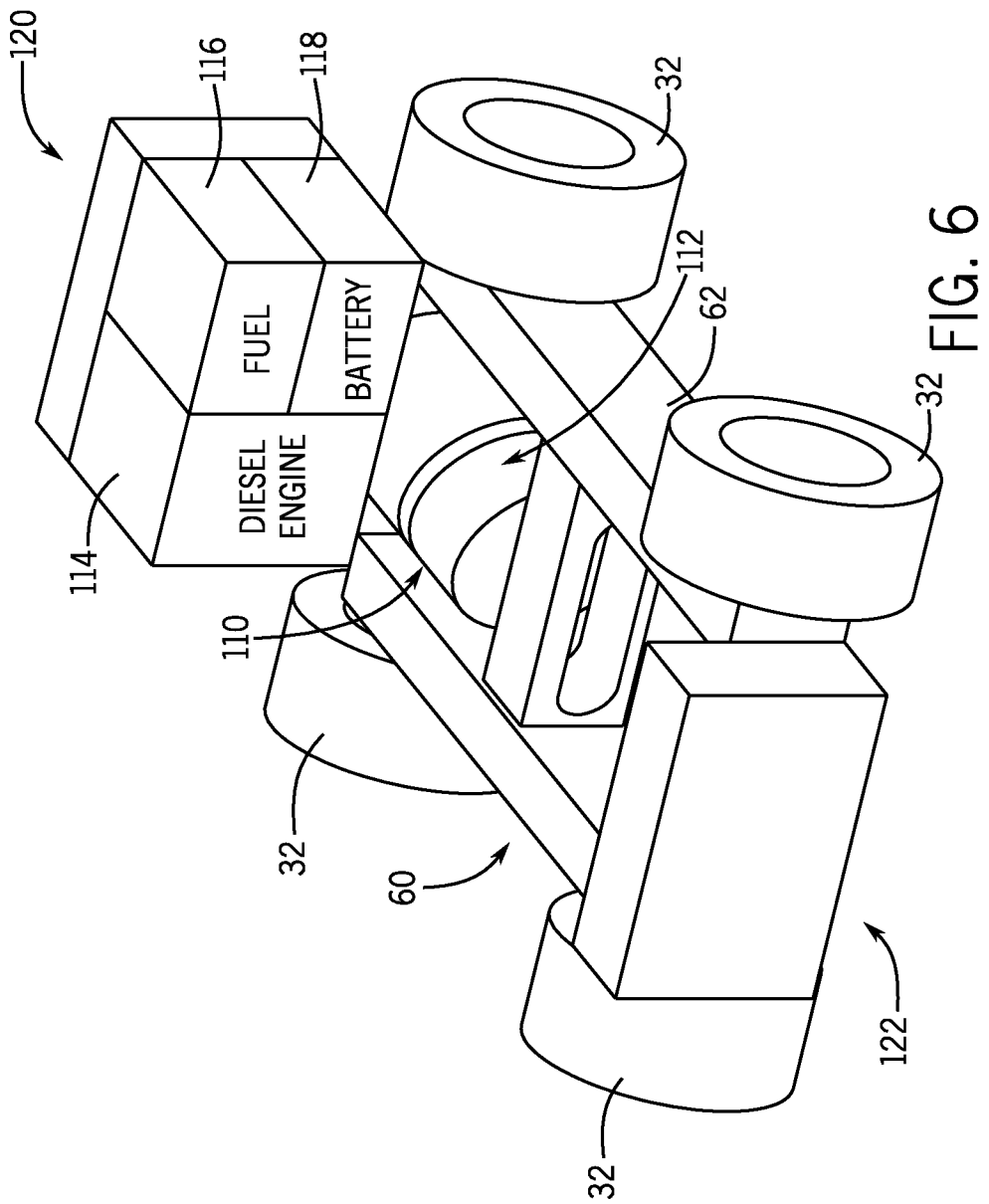
FIG. 6 is a perspective view of an embodiment of the autonomous cart of FIG. 1 including hydrostatic pumps for propulsion.

A variety of power may be used to energize the autonomous cart 10. For example, FIG. 6 illustrates the use of hydrostatic power, according to an embodiment. More specifically, two hydrostatic pumps 110, 112, are illustrated mounted onto the chassis 60. A hydrostatic pump 110 may be used to provide motive power to one or more of the right side wheels 32, while hydrostatic pump 112 may be used to provide motive power to one or more of the left side wheels 32. In use, the hydrostatic pumps 110, 112 may be powered by a variety of power systems, such as a combustion engine (e.g., diesel engine or gasoline engine) 114. Accordingly, a fuel repository 116 for the combustion engine 114 is shown, suitable for delivering fuel to the combustion engine 114. The hydrostatic pumps 110, 112 may be powered via electrical power, and thus a battery 118 is shown. Also shown is a cooling system 120 suitable for maintaining a desired temperature for certain components of the autonomous cart 10, such as the combustion engine 114. To improve weight distribution, a counterweight 122 may be disposed on an end opposite to the power systems end. In this manner, a more evenly balanced autonomous cart 10 may be provided.

Figure 7:
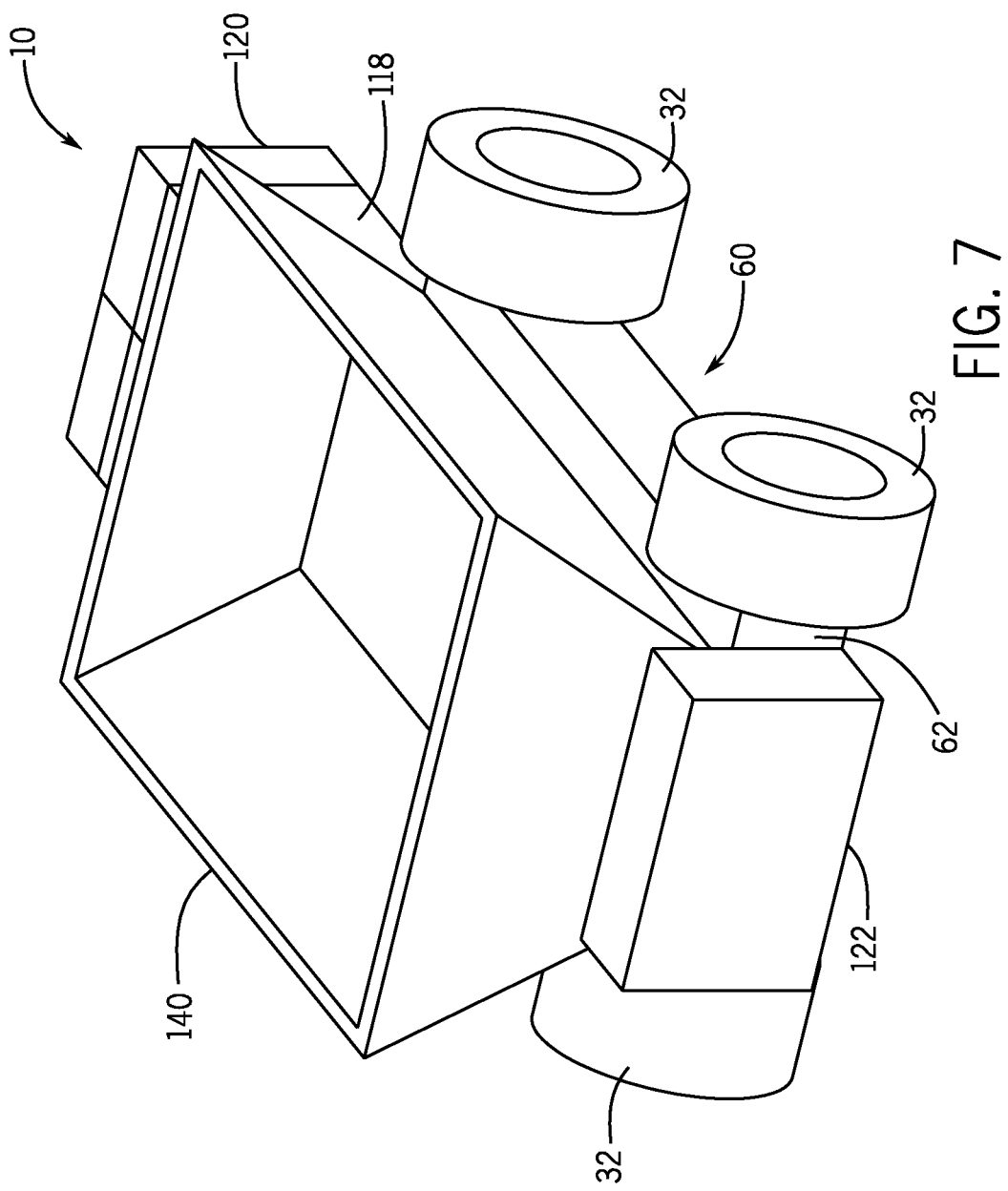
FIG. 7 is a perspective view of an embodiment of the autonomous cart of FIG. 6 including a container for collecting agricultural product disposed on top of a chassis.

The autonomous cart 10 may be used for a variety of tasks, such as transporting grain or other agricultural product. Accordingly, FIG. 7 illustrates an embodiment of the chassis 60 and power supply systems and hydrostatic pumps of FIG. 6 having a bed 140 disposed on top of the chassis 60. As can be understood, the bed 140 may be disposed on any of the chassis 60 figures shown previously. Other types of beds and/or devices may be mounted onto the chassis 60, such as auger spouts, intake hoppers, cranes, conveyance devices (e.g., belt conveyors), and so on. In use, agricultural product may be transported in the bed 140, for example, as described above in FIG. 2.

Figure 8:
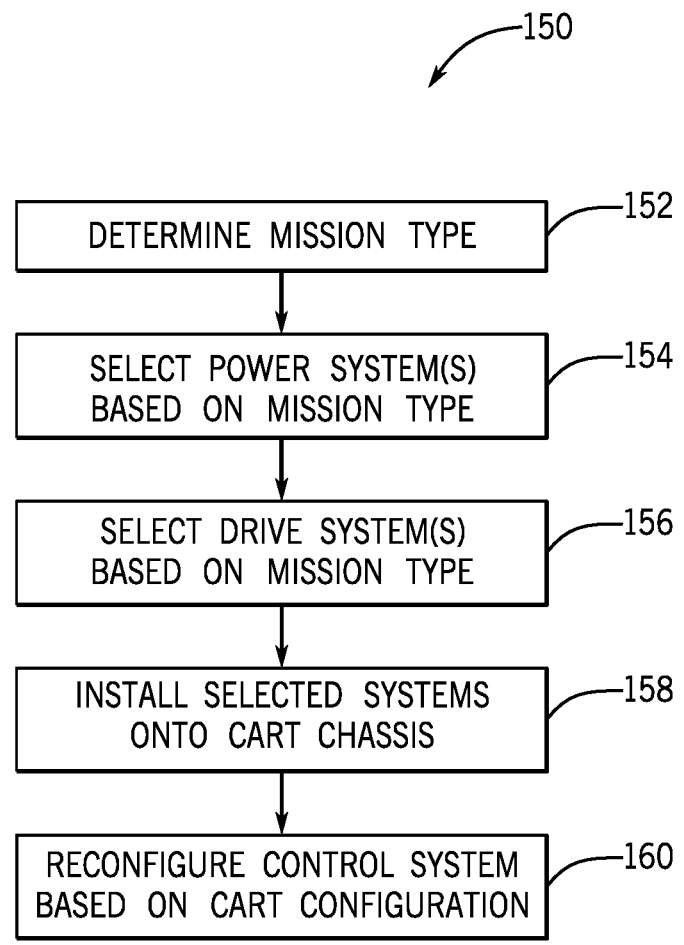
FIG. 8 is flowchart of an embodiment of process useful in manufacturing one or more autonomous carts, such as the cart shown in FIG. 1.

Turning now to FIG. 8, the figure illustrates and embodiment of a process 150 suitable, for example, for manufacturing one or more autonomous carts 10. In the depicted embodiment, the process 150 may be implemented as computer instructions or code executable via a hardware processor and stored in a memory of a computing device (e.g., personal computer, laptop, notebook, tablet). As illustrated, the process 150 may first determine (block 152) a mission type for the autonomous cart 10. For example, determination of the mission type may include determination of a mission parameter such as a torque, a speed, a number of operating hours in the field (e.g., how many hours should the cart 10 operate between reloading of fuel), and so on. For example, the torque, the speed, and the number of operating hours may be determined based on a desired load that the cart 10 would carry, a type of agricultural product that the cart 10 would carry, conditions that the cart 10 would encounter (e.g., types of fields being harvested, such as sandy fields, rocky fields), and so on. The torque, the speed, and the number of operating hours may additionally or alternatively be determined based on a vehicle that the cart 10 is supporting, such as the combine 42. That is, the combine 42 may operate at a desired speed and/or in certain desired types of fields, and thus the cart 10 may include similar operating parameters.

Based on the mission type, the process 150 may then select (block 154) one or more power systems. For example, each power system (e.g., battery, compressed natural gas (CNG) fuel canister, supercapacitor, hydrostatic system, electric generator, combustion engine) may provide for different mission parameters such as torque, speed, operating hours, and so on. One or more power systems may be selected (block 154). The process 150 may match (block 156) the desired power system(s) with respective drive systems (e.g., in-wheel electric motor system 66, non-in-wheel electric motor 80, chain drive, hydrostatic pump, shaft drive) and so on. Availability and cost of certain fuel types, such as solar power, natural gas, gasoline, diesel, and so on, may also be used in determining (block 156) one or more power systems to use.

The process 150 may then install (block 158) the selected power systems and drive systems onto, for example, the chassis 60. Once installed, the process 150 may then reconfigure or reprogram certain components (e.g. processor 16 of the control system 12) to better control the installed power system and drive systems. For example, specific code suitable to control the delivery of power from the power systems may be loaded onto the processor 16. Similarly, specific code suitable to control the application of the power via the drive systems may be loaded onto the processor 16. The autonomous cart may then be operated. It is to be noted that the process 150 may be performed by the manufacturer of the cart 10, but also by the operator of the cart 10. Indeed, the operator may, in the field, replace certain components (e.g., power systems, drive systems) with other components (e.g., other power systems, drive systems) or add the aforementioned components to better target field operations.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method of manufacturing an autonomous cart, comprising:
   determining a mission type for the autonomous cart;
   determining a power system for powering the autonomous cart based on the mission type;
   determining a drive system suitable for converting a power delivered by the power system into motive power suitable for moving the autonomous cart based on the power system and the mission type;
   installing, in a field, the power system onto a chassis of the autonomous cart;
   installing, in the field, the drive system onto the chassis of the autonomous cart, wherein the autonomous cart comprises a control system configured to drive the autonomous cart autonomously via the power system and the drive system; and
   reconfiguring, in the field, the control system based on the power system installed and on the drive system installed.

2. The method of claim 1, wherein determining the mission type comprises determining a torque, a speed, a number of operational hours, or a combination thereof, for the autonomous cart.

3. The method of claim 2, comprising determining the torque, the speed, the number of operational hours, or the combination thereof, comprises determining the torque, the speed, the number of operational hours, or the combination thereof, based on an agricultural crop to be carried by the autonomous cart.

4. The method of claim 2, comprising determining the torque, the speed, the number of operational hours, or the combination thereof, comprises determining the torque, the speed, the number of operational hours, or the combination thereof, based on an agricultural vehicle to be supported by the autonomous cart.

5. The method of claim 1, wherein determining a power system for powering the autonomous cart based on the mission type comprises determining the power system based on an availability of an energy source, a cost of an energy source, or a combination thereof.

6. The method of claim 1, wherein the power system comprises a battery, a compressed natural gas (CNG) fuel canister, a supercapacitor, a hydrostatic system, an electric generator, a combustion engine, or a combination thereof.

7. The method of claim 1, wherein the drive system comprises an in-wheel electric motor, a non-in-wheel electric motor, a hydrostatic pump, a chain drive, a shaft drive, or a combination thereof.

8. The method of claim 1, wherein the control system is configured to drive the autonomous cart to follow an agricultural vehicle to offload an agricultural product from the agricultural vehicle onto the cart during operations of the agricultural vehicle.

9. The method of claim 1, comprising installing a container for collecting agricultural product on top of the chassis.

10. An autonomous cart, comprising:
    a chassis,
    a power system disposed on the chassis and configured to power the autonomous cart, wherein the power system is configured to be installed onto the chassis in a field;
    a drive system disposed on the chassis and suitable for converting a power delivered by the power system into motive power suitable for moving the autonomous cart, wherein the drive system is configured to be installed onto the chassis in the field;
    a controller, comprising a processor and a memory, wherein the controller is configured to be reconfigured in the field, after determining a specific mission type, based on the power system installed and on the drive system installed; and
    a steering system communicatively coupled to the controller, wherein the controller is configured to instruct the steering system to steer the autonomous grain cart, wherein the chassis is configured to support a specific mission type via the power system and the drive system.

11. The autonomous cart of claim 10, wherein the chassis comprises a second power system and a second drive system, the second power system is configured to be installed onto the chassis in the field to support the specific mission type, the second drive system is configured to be installed onto the chassis in the field to support the specific mission type, and the controller is configured to be reconfigured in the field, after determining the specific mission type, based on the second power system installed and the second drive system installed.

12. The autonomous cart of claim 10, wherein the power system comprises a battery, a compressed natural gas (CNG) fuel canister, a supercapacitor, a hydrostatic system, an electric generator, a combustion engine, or a combination thereof.

13. The autonomous cart of claim 10, wherein the drive system comprises an in-wheel electric motor, a non-in-wheel electric motor, a hydrostatic pump, a chain drive, a shaft drive, or a combination thereof.

14. The autonomous cart of claim 10, wherein the specific mission type comprises a desired torque, a desired speed, a desired number of operational hours, or a combination thereof, for the autonomous cart.

15. A system for continuously conveying agricultural product, comprising:
    an agricultural vehicle comprising a header configured to harvest agricultural product from a field; and
    at least one autonomous grain carts configured to receive the agricultural product from the agricultural vehicle, wherein the at least one autonomous grain cart comprises:
    a chassis,
    a power system disposed on the chassis and configured to power the autonomous cart, wherein the power system is configured to be installed onto the chassis in a field;
    a drive system disposed on the chassis and suitable for converting a power delivered by the power system into motive power suitable for moving the autonomous cart, wherein the drive system is configured to be installed onto the chassis in the field;
    a controller, comprising a processor and a memory; and
    a steering system communicatively coupled to the controller, wherein the controller is configured to instruct the steering system to steer the autonomous grain cart, the controller is configured to be reconfigured in the field, after determining a specific mission type, based on the power system installed and on the drive system installed, and the chassis is configured to support the specific mission type via the power system and the drive system.

16. The system of claim 15, wherein the power system comprises a battery, a compressed natural gas (CNG) fuel canister, a supercapacitor, a hydrostatic system, an electric generator, a combustion engine, or a combination thereof.

17. The system of claim 15, wherein the drive system comprises an in-wheel electric motor, a non-in-wheel electric motor, a hydrostatic pump, a chain drive, a shaft drive, or a combination thereof.

18. The system of claim 15, wherein the specific mission type comprises a desired torque, a desired speed, a desired number of operational hours, or a combination thereof, for the autonomous cart.

* * * * *